Nov. 21, 1967  C. E. BANNISTER  3,353,612
METHOD AND APPARATUS FOR EXPLORATION
OF THE WATER BOTTOM REGIONS
Filed June 1, 1964   3 Sheets-Sheet 1
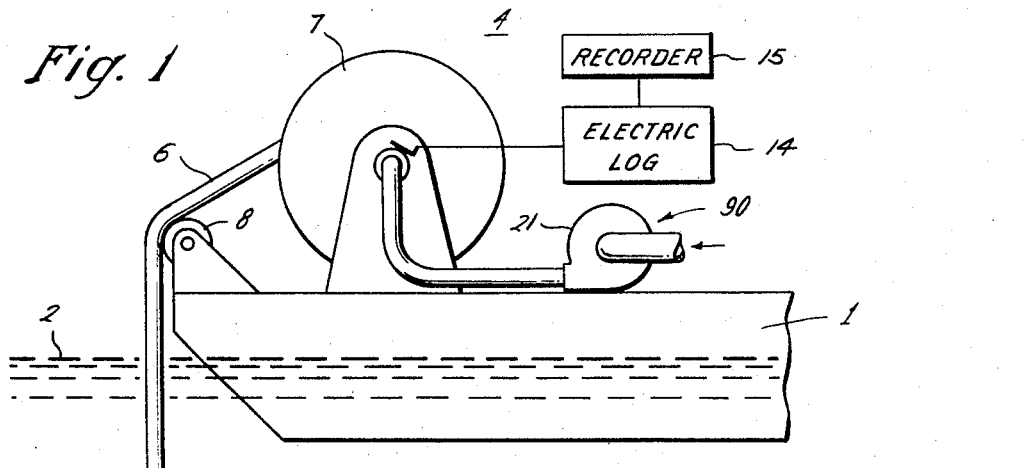
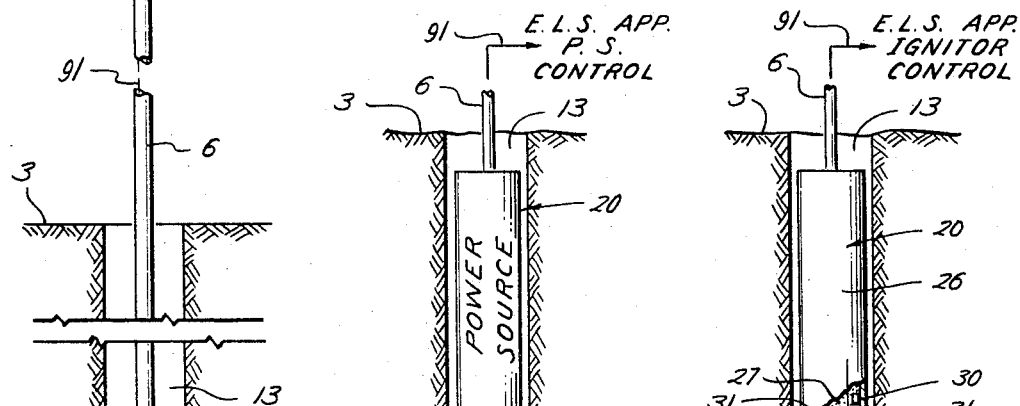
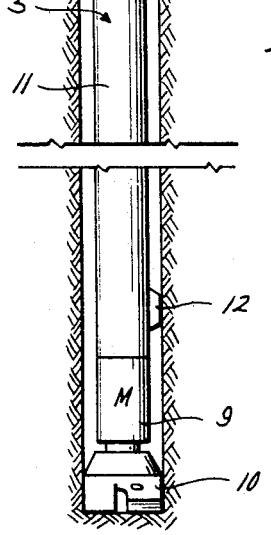
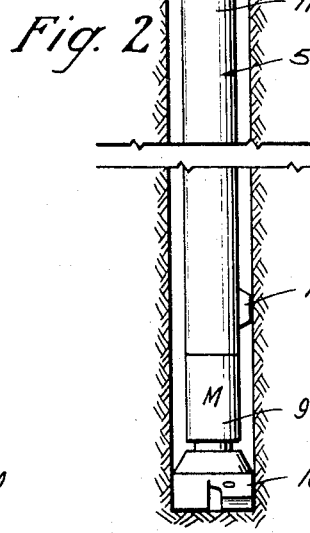
Clyde E. Bannister
INVENTOR.
BY William T. Fryer III
ATTORNEY

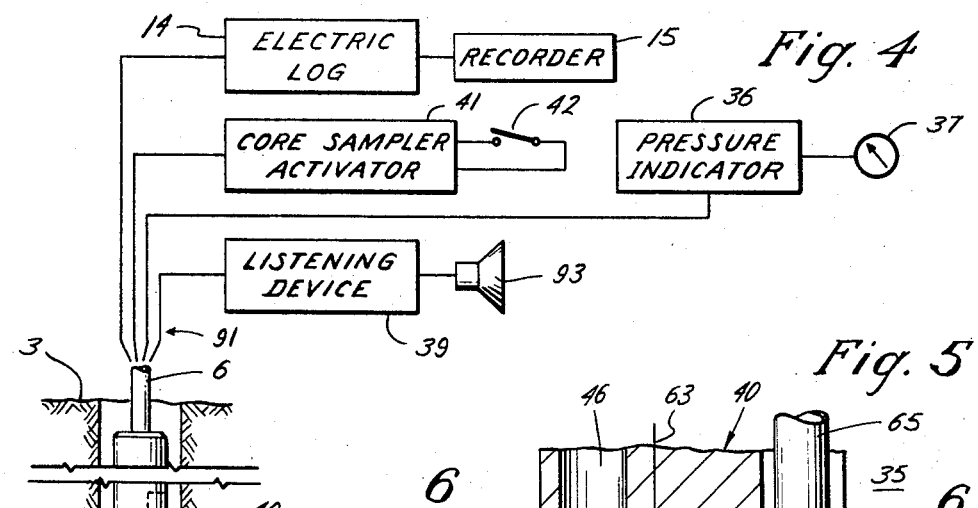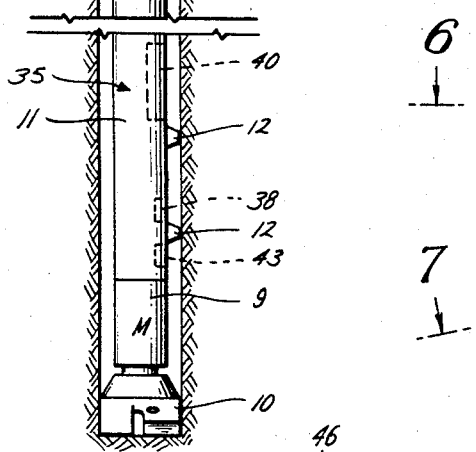

Nov. 21, 1967
C. E. BANNISTER
3,353,612
METHOD AND APPARATUS FOR EXPLORATION
OF THE WATER BOTTOM REGIONS
Filed June 1, 1964
3 Sheets-Sheet 3
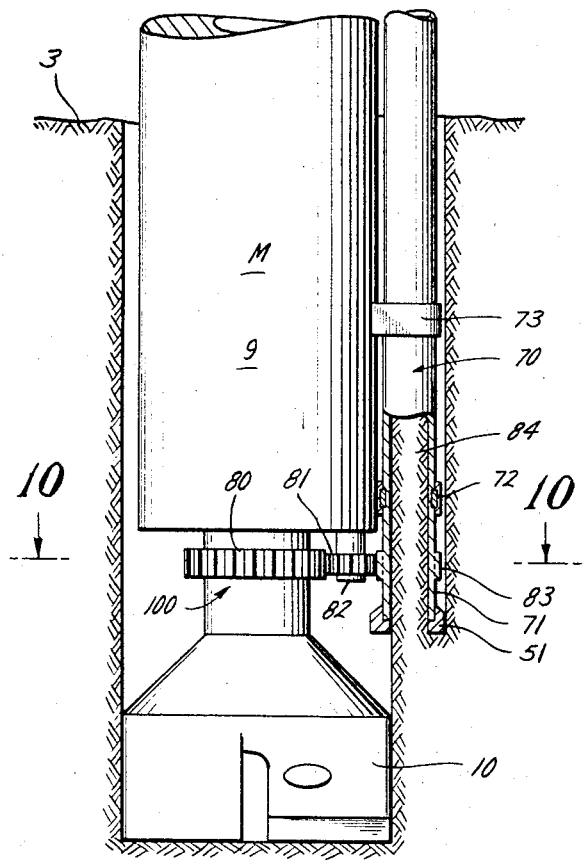
Fig. 8
Fig. 9
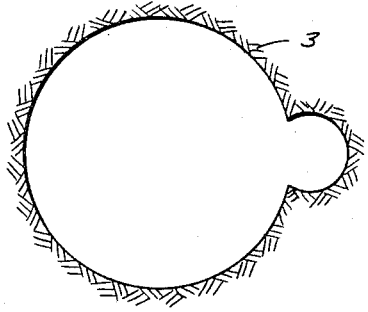
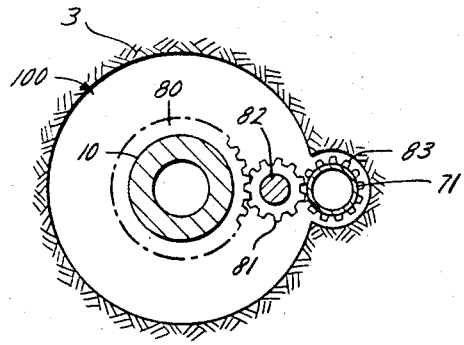
Fig. 10
Clyde E. Bannister
INVENTOR.
BY William T. Fryer III
ATTORNEY

3,353,612
METHOD AND APPARATUS FOR EXPLORATION OF THE WATER BOTTOM REGIONS
Clyde E. Bannister, 2727 Carolina Way, Houston, Tex. 77005
Filed June 1, 1964, Ser. No. 371,279
37 Claims. (Cl. 175—6)

The present invention relates to exploration of subsurface regions of the earth and, more particularly, to apparatus and method for penetrating the surface of the earth below a body of water to gain geological information.

The recent advent and success of space research has prompted a renewed effort in inner-earth exploration. Just as outer space holds vast unexplored regions, the earth has regions that have hardly been touched, from a research standpoint. One of the prime unexplored earth regions lies under our bodies of water. In the water bed or bottom are geological formations wherein important information and valuable deposits of minerals or hydrocarbons exist.

The failure to commence detailed exploration of the water bottom has not been due to a lack of interest. One of the main drawbacks has been a lack of adequate and reliable exploration equipment. Apparatus and methods that are conventional in one area of geological research are not completely satisfactory for exploring the water bottom. For example, the conventional rotary rig used in oil well drilling presented several disadvantages and did not solve the chief problem of how to bring back geological information.

The present invention resulted from my effort to provide apparatus that can be used to penetrate the water bottom and retrieve geological information. The apparatus of my invention has several advantages, such as ease of operation, reliability, short time to set up and move, and high yield of geological information for a modest financial investment.

These objects, features and advantages, as well as others, will be apparent from the following description of several preferred embodiments of systems and survey tools arranged in accordance with my invention, reference being made to the attached figures wherein:

FIG. 1 is an elevation view, partially in section, of a vessel equipped with one embodiment of a survey tool in accordance with my invention for penetrating the water bottom to obtain geological information.

FIG. 2 is an elevation view, partially in section, of another embodiment of a survey tool in accordance with my invention for boring into a water bottom.

FIG. 3 is an elevation view, partially in section, of another embodiment of a survey tool in accordance with my invention for boring into a water bottom.

FIG. 4 is an elevation view in section of another embodiment of a survey tool in accordance with my invention for boring into a water bottom.

FIG. 5 is a fragmentary view in elevation and partially sectioned of one embodiment of a survey tool having a device for withdrawing a sample of the water bottom.

FIG. 6 is a horizontal section along the lines 6—6 of FIG. 5.

FIG. 7 is a horizontal section along the lines 7—7 of FIG. 5.

FIG. 8 is a fragmentary view in elevation and partially in section of another embodiment of a survey tool having a device for withdrawing a sample of the water bottom.

FIG. 9 is a horizontal section through the water bottom showing the borehole shape produced by the survey tool shown in FIG. 8.

FIG. 10 is a horizontal section along the lines 10—10 of FIG. 8.

My invention can be described briefly with reference to one preferred embodiment as an apparatus for boring into the water bottom and at the same or at selected times surveying the formation being bored. The apparatus comprises a rotary, oscillating drill lowered into the water on a line. Power is supplied to operate the drill, either through the line or, more preferably, by a power source integral with the drill. The drill includes means for surveying the formation being bored to provide continuous information transmitted as electrical signals up conductors in the line to an indicating means at the surface. The drill can also include a device for sampling the formation being bored into and storing the samples for retrieval when the drill is raised. More specifically, one embodiment of my invention includes a rotary, oscillating drill comprising a fluid driven oscillating motor driving a bit and attached to an inertia barrel suspended from a flexible cable to drill into the formation without significant rotary movement of the cable motor, or inertia barrel. The stable inertia barrel accommodates a logging device that can operate as the drill bores, to measure continuously a characteristic of the formation. The measured characteristic is transformed into an electrical signal and carried on electrical conductors in the cable to an indicator at the surface.

The oscillating motor is energized by a power source mounted on and lowered with the drill to supply a high pressure gas that drives a fluid pump on the drill. The fluid pump draws water from adjacent the drill to drive the oscillating motor. The drill is equipped with a device to obtain a substantially vertical core from the formation being drilled. In one form the sampling device comprises a core barrel mounted on the side of the drill and rotatably driven by the oscillating motor to operate continuously and withdraw a continuous vertical core. In another form the sampling device comprises a core barrel mounted in the inertia barrel and controlled from the surface to pivot outward to engage the formation at selected depths. The core barrel is rotatably driven and stores the cores from the several depths for retrieval at the surface.

The problems encountered in the exploration of the water bottom are unique and have presented a challenge for development of adequate exploration apparatus. As mentioned briefly above, prior art water bottom exploration devices have been limited in the depth they can reach. Submarine type vehicles are expensive and also limited to depths where the pressure will not collapse the hull. Dredges have limited success and are primarily useful for shallow penetration.

The restrictions on the diver, submarine-type vehicle, and dredge, led to my invention of a survey tool for a wide range of water depths. Deep ocean bottom as well as off shore, continental shelf exploration, are now more feasible.

It is not, however, feasible to use just any arrangement of sub-surface probe as a survey tool for exploring the water bottom. A unique phenomena encountered in water is the uncertain and often fast currents that can easily bend and break an elongated rigid member. Another problem is that water pressure increases with depth and can force leaks. The chemical nature of some water accelerates rust and deterioration of metal parts. Finally, and by no means of small importance, is the buoyancy effect of water on some submerged devices that tends to make it difficult, if not impossible, to guide these devices without elaborate auxiliary equipment.

These environmental limitations and the financial costs to overcome them dictate a compromise that successfully blends good results and all around equipment reliability. My invention utilizes a survey tool that rapidly descends to the water bottom and commences boring and surveying. The amount of metallic equipment exposed to the water is minimized. The survey tool, including the power source, is substantially entirely located in one area near the water bottom and can be protected against leaks. Control of the survey tool remains at the surface, with provision for monitoring the boring operation and survey information and selecting the depths for formation core samples to be taken.

The general arrangement of one form of my invention is illustrated in FIG. 1. An appropriate vessel, such as barge 1, transports exploration apparatus 4 by water 2 to a chosen site above water bottom 3. Exploration apparatus 4 includes a survey tool 5 having an inertia barrel 11 suspended at the end of a weight carrying line 6, shown partially unwound from a motor driven reel 7 over guide wheel 8 on barge 1. Survey tool 5 is equipped with a rotary oscillating motor 9, attached to inertia barrel 11, that drives a bit 10 suitable for boring into water bottom 3. Energy is supplied to motor 9, as will be described further on, to oscillate bit 10. As bit 10 oscillates, cutting into water bottom 3, inertia barrel 11 does not rotate due to its heavy mass and the high oscillating movement of bit 10. Accordingly, line 6 does not twist and survey tool 5 is substantially stable in position.

An integral part of survey tool 5 is a survey means for determining a characteristic of water bottom 3. Either a logging or coring type survey means, or both, can be provided. The logging type survey means has a unique advantage in this combination since its operation reliability is greatly enhanced by being mounted on a stable support. For example, as shown, survey tool 5 is equipped with two or more electrodes 12 insulatedly mounted on inertia barrel 11 to contact the wall of borehole 13 as the survey tool bores into water bottom 3. Electrodes 12 are connected to electrical conductors 91 in line 6 to form a circuit for passing electric current through the borehole wall from an electric log surveying apparatus 14 on barge 1. The electrical resistance of the borehole wall is measured in this manner, in accordance with conventional technique, and indicated as a permanent record on a recorder 15.

The use of exploration apparatus 4 as thus far described is apparent. Barge 1 moves to the chosen site, survey tool 5 is lowered over the side and unreeled until water bottom 3 is reached. The weight of survey tool 5 is sufficient to overcome bouyancy and place substantial load on bit 10 to commence boring. The borehole 13 increases in depth and electrodes 12 contact the borehole wall to continuously measure the adjacent formation electrical resistance. When the borehole has reached sufficient depth, survey tool 5 is withdrawn and is ready to probe again into bottom 3 at another site. By proper deployment, survey tool 5 will remain upright. Tension on line 6 is a good indication of the attitude of survey tool 5. If desired, an inclination sensing means (not shown) can be placed on survey tool 5 and coupled over electrical conductors 91 in line 6 to an indicator (not shown) on barge 1, and the attitude of survey tool 5 can be precisely maintained by observing the inclination indicator and adjusting the tension on line 6 with motor driven reel 7.

Other logging means can be installed in survey tool 5. For example, induction or nuclear logging can be employed to continuously indicate a characteristic of the formation being bored. The stability of survey tool 5 during boring enhances the reliability of the measurement.

The motive energy for sustaining the boring of survey tool 5 is drawn from a power source 20, preferably mounted on survey tool 5 to submerge therewith as shown in FIG. 2. In FIG. 2, as in the other figures, like parts are identified by the same reference numbers. Another arrangement is power source 90 shown in FIG. 1, wherein line 6 is in the form of a hose having a weight bearing cable and the electric conductors as well as a central passage connected at one end to a motor driven pump 21. The other end of the central passage in line 6 is coupled, through tubes (not shown), to motor 9 which is, in this arrangement, a fluid actuated oscillating motor such as described in my copending application 265,839, filed Mar. 18, 1963, and now Patent No. 3,183,787. Pump 21 receives energy from a gasoline engine, for example, and sucks water from the body of water adjacent barge 1 and delivers water at a high pressure to motor 9 to sustain the boring.

The self-propelled or sustained survey tool 5 of FIG. 2 is a unique combination with several advantages. Primarily, power source 20 provides the energy to energize motor 9. High amounts of electrical or fluid power need not be transmitted from the water surface. The energy can be stored and released, such as a gas under pressure in a container, e.g. compressed air, to drive a gas operated oscillating motor, or the mass can be transformed or converted into energy by nuclear reactions. The preferred example of a converted power source is a nuclear reactor that needs only a small amount of nuclear fuel at a critical mass to maintain a fission reaction and generate heat that is easily converted to steam. The steam drives a steam turbine coupled to the bit drive motor of any type, or to a fluid pump, as will be described below, to energize a fluid-type oscillating motor 9. The weight of power source 20 helps to load bit 10. Also, with power source 20 on survey tool 5, line 6 can be smaller, with electrical conductors and a weight bearing cable, to cut down on the surface area susceptible to water currents. Power source 20 can be of any size and does not have to go into borehole 13.

The operation of power source 20, i.e. start and stop, adjustment of power level, is provided by a power source control (not shown) on barge 1 connected through conductors 91 in line 6. Thus line 6 can be a flexible weight carrying cable having the electrical conductors 91 for the power supply (P.S.) control and the electric log surveying apparatus (E.L.S. App.) 14. If a compressed gas is used to energize a gas driven oscillating motor 9, the power source control, when turned on, opens the gas container (not shown) and motor 9 commences boring. The gas flow can be turned off to stop motor 9. The control can be by means of a servo on barge 1 that, when turned, adjusts a corresponding servo on survey tool 5 to open a valve on the gas container.

Another type of gas power source 20 is shown on survey tool 25 (FIG. 3). Power source 20 is especially designed for compactness and high energy by utilizing a propellant 27 such as PKN (Hercules Powder Company trademark) in a structurally rigid, waterproof, and reinforced container 26 at the upper end of survey tool 25. The cool burning propellant 27 is arranged either with the grains all burning simultaneously or grouped in tandem, to produce about 26 cubic feet of gas per minute for 15 minutes at 10,000 p.s.i., for example. Approximately 3,366 pounds of a cool burning propellant would be required.

The propellant 27 is ignited by throwing a switch (not shown) on barge 1 in an ignitor control circuit connected through electrical conductors 91 in line 6 to an ignitor 30 at the lower end of container 26. Gas exits through exhaust ports 31 to drive a gas motor 32 and leaves survey tool 25 through exhaust port 33. Gas motor 32 is mechanically coupled to a pump 34 that draws water from adjacent survey tool 25 through inlet port 35 and delivers the water under pressure, through fluid passages 36 (dashlines) in inertia barrel 11 to a fluid oscillating motor coupled to a bit as shown in FIG. 2. This chain of actions, from the generation of gas to the oscillation of the bit driven by the fluid oscillating motor, produces a rapid boring into water bottom 3. Gas motor 32, pump 34, and the fluid motor can be of several designs, such as the motor (convertible to a pump) of my above mentioned copending application (the impeller blade of the motors and pump are outlined in dashlines). The fluid from motor 9 passes through bit 10 to help wash away the cuttings from borehole 13.

Survey tool 25 performs the dual functions of boring and logging as electrodes 12 (only one is shown in FIG. 3) contact the borehole wall.

With a stored energy power source 20, such as compressed air or propellant, the energy should be conserved, if possible. Ideally, the oscillating motor 9 should not be started until it reaches water bottom 3. I have provided methods and apparatus for conserving the stored or converted mass, by starting the motor 9 just before it hits the water bottom 3, and for adjusting the survey tool for optimum operation. These methods are described with reference to survey tool 35 (FIG. 4), like the aforementioned survey tools, in having an inertia barrel 11, oscillation motor 9, bit 10, electric logging apparatus 14, recorder 15, and electrodes 12. Either the attached power source 20 of survey tool 5 in FIG. 2 or the surface mounted power source 90 of FIG. 1 can be employed. The example of FIG. 4 omits this feature for clarity. Pump 21 and the associated surface devices can be coupled through the central passage and electrical conductors 91, respectively, in line 6.

At the lower end of survey tool 35 on motor 9 is a transducer 43 sensitive to the water pressure and connected through electrical conductors 91 passing through survey tool 35 to a pressure indicator 36 having a meter 37. The water pressure adjacent bit 10 is continuously readout on meter 37. Just above motor 9 in inertia barrel 11 is a microphone 38 sensitive to pressure variations in the water and capable of picking up the sound of motor 9. Microphone 38 is connected through electrical conductors (not shown) in survey tool 35 and electrical conductors 91 to a listening device 39 that amplifies the motor sounds and reproduces the sounds in speaker 93.

Survey tool 35 is lowered into the water, knowing the approximate depth of the water bottom 3. When the water pressure is close to the amount for the known depth of water, pump 21 or the power source 20 is started, oscillating bit 10. Almost immediately bit 10 reaches water bottom 3 and the sounds from speaker 93 indicate a slowing down of motor 9 as the boring commences. The motor sounds further indicate if bit 10 is moving easily or with difficulty through water bottom 3 and can be used as a guide for deploying or retrieving line 6. For example, if the motor speed drops too low, line 6 can be raised enough to give bit 10 slightly less load or, conversely, if the motor sounds are above normal the line should be released slightly to accelerate the boring.

An optional, but very desirable feature of a survey tool is a sampling device. A sampling device can be part of survey tool 5 (FIGS. 1 and 2), if desired, to retrieve one or more cores from the borehole wall. Often the only definitive way to determine certain geologic facts is by taking samples for study and analysis. Two embodiments of sample devices are illustrated herein (FIGS. 5 and 8) for attachment to any survey tool.

Survey tool 35 (FIG. 4) has a sampling device 40 (outlined in dashlines) that is selective, being operable to take substantially vertical cores from the wall at desired depths in borehole 13. Sampling device 40 is connected, through electrical conductors 91 in line 6 to a sample activator 41 having a switch 42. Every time switch 42 is closed a core sample is being taken. When switch 42 is opened the core sampling device 40 is withdrawn into inertia barrel 11 to await the next command to take a core sample.

The selective sampling device 40 is shown (FIG. 5) as an integral part of inertia barrel 11 and disposed in a recess 45 (FIG. 6) adjacent the passages 46 that carry fluid to energize motor 9. Recess 45 is elongated along the length of survey tool 35 and has an elongated carriage 47 disposed therein. Carriage 47 is pivotally mounted at its upper end on pin 48 (FIG. 7) fixed in inertia barrel 11 to swing outward at its lower end, as shown in FIG. 5. Rotatably mounted on carriage 47 in bearings 49 is a core barrel 50 which projects outward at its lower end, below carriage 47, and has a core bit 51 attached thereto.

Carriage 47 is normally held entirely in recess 45 of inertia barrel 11 by the tension from a spring 52 fixed between inertia barrel 11 and carriage 47. Movement of carriage 47 outward is controlled by core sampler actuator 41 at the surface. When switch 42 is closed, an armature 95 of a solenoid 54, connected by electrical conductors 63 and 64, moves in (right to left in FIG. 5) and operates on actuator arm 55 pivotally attached by a pin 96. Actuator arm 55 is fixed at the other end to a bracket 97 secured to carriage 47 and when pulled in pivots the lower end of carriage 47 outward. As long as switch 42 is closed, core barrel 50 is in a position to remove a substantially vertical core from the borehole wall. Preferably, the outward position of core barrel 50 is such that the borehole wall outer edge is trimmed.

Core barrel 50 is driven in an oscillating manner to enable core bit 51 to cut into the borehole wall. The drive is furnished by oscillating motor 9 which has its oscillating impeller blade drive shaft 56 connected to one end of a flexible drive shaft 57. The other end of flexible drive shaft 57 is connected to a shaft 58 rotatably supported in mounted bearings 59 and 60 on carriage 47. Fixed to shaft 58 is a gear 61 that meshes with a gear 62 surrounding and fixed to core barrel 50. As drive shaft 56 of motor 9 oscillates so does drive shaft 57 and gears 61 and 62, oscillating core barrel 50, journaled in bracket 97, to enable core bit 51 to cut into the borehole wall. The core removed from the borehole wall enters the central passage of core barrel 50, moving upward and into a stationary core tube 65 (FIG. 6) fixed lengthwise to inertia barrel 11. The junction between core barrel 50 and core tube 65 is completed by a sleeve 66 of a flexible material overlying the ends. Stationary core tube 65 stores a considerable length of core sample.

Another form of sampling device (FIGS. 8, 9, and 10) furnishes a continuous vertical core of the borehole wall as a survey tool is boring. This continuous sampling device 70 (FIGS. 8, 9, and 10) can be attached to either survey tool 5 (FIGS. 1 and 2) or survey tool 35. The essential feature of sampling device 70 is a rotary oscillating core barrel 71 mounted on the side and along the length of oscillating motor 9 and inertia barrel 11 in bearings 72 and 73 fixed to motor 9. Core barrel 71 is coupled by a flexible joint (not shown) to a stationary core barrel (not shown) attached to inertia barrel 11 and extending lengthwise thereof, like stationary core tube 65 in FIG. 5, so that the core entering core barrel 71 can move into the stationary core barrel for storage. The shape of the borehole 13 is as shown in FIG. 9. The lower end of core barrel 71 has a core bit 51 that cuts into the borehole wall to extract the core 84. The rotary oscillating motion of bit 10 is coupled to core barrel 71 by a gear train 100 (FIG. 10), comprising a gear 80 surrounding the neck of bit 10 and attached thereto. Gear 80 drives a gear 81 fixed to a shaft 82 rotatably mounted in the lower face of oscillating motor 9. Gear 81 drives a gear 83 that is fixed to and surrounds core barrel 71.

The various preferred embodiments described above are examples of survey tools for exploration of the water bottom. The optimum survey tool for one particular exploration site may not require sampling, while at another site it is essential. The advantages of a self propelled survey tool are apparent, although a surface located power source may be adequate under some circumstances. The survey tool is equipped to penetrate the water bottom and at the same time continuously log a characteristic of the borehole wall.

While the above described embodiments are preferred forms at the present time, it is apparent that changes and modifications can be made without departing from my invention. Similarly, other embodiments and forms of apparatus can practice my invention, both method and apparatus and these changes, modifications and other embodiments are to be within the scope of my invention as defined by the appended claims.

What I claim is:

1. Apparatus for sub-surface exploration, comprising oscillating rotary drilling means including an inertia barrel, an oscillating motor supported at the end of a weight carrying suspension means to produce stable movement of said drilling means into the formation, and means for surveying a sub-surface characteristic of a formation as said drilling means bores into said formation.

2. Apparatus for exploration of a water bottom, comprising means for rotary, oscillating drilling into the water bottom to produce stable movement of said drilling means into the water bottom, means for logging a characteristic of the water bottom during the drilling and transmitting the logging information to the water surface, and means for indicating the logging information transmitted to the surface.

3. Apparatus, as described in claim 1, wherein said surveying means comprises sampling means that removes a core from said formation as said drilling means bores into said formation.

4. Apparatus, as described in claim 1, wherein, said surveying means comprises an electric logging means comprising spaced electrodes in contact with said formation for obtaining a resistance log as said drilling means bores into said formation.

5. Apparatus for surveying a characteristic of a sub-surface formation, comprising a rotary, oscillating drill, said drill having an oscillating motor connected to a bit and carried by an inertia barrel to produce stable movement of said drill into said formation, a flexible line for suspending said drill, means for providing energy to operate said oscillating motor, a logging instrument on said drill for producing an electrical signal that is a function of a characteristic of a formation being drilled, said line having electrical conductors to carry said electrical signal to the surface, and means for receiving said electric signal at the surface to indicate the formation characteristic.

6. Apparatus for taking an electric log of the bottom of a body of water, comprising a fluid actuated oscillating motor, a bit driven by said oscillating motor, an inertia barrel connected to said oscillating motor, a weight carrying hose having a fluid passage coupled to said oscillating motor, means for providing a fluid under pressure to the opposite end of said hose from said oscillating motor, at least two electrodes mounted on said inertia barrel and spaced longitudinally apart for contacting the borehole wall and passing a current, said hose having electrical conductors connected to carry a signal that is a function of said current to the water surface, means to be disposed at the surface and connected to said conductors for indicating the borehole wall electrical resistance.

7. Apparatus for sub-surface exploration, comprising, oscillating, rotary drilling means to be disposed at a depth beneath a surface to produce stable movement of said drilling means into a formation, a power source on said drilling means to be disposed beneath said surface to supply all the energy for the drilling operation, and survey means on said drilling means for determining a characteristic of the formation being drilled.

8. Apparatus, as described in claim 7, wherein said surveying means comprises sampling means that removes a core from said formation as said drilling means bores into said formation.

9. Apparatus, as described in claim 7, wherein, said surveying means comprises an electric logging means comprising spaced electrodes in contact with said formation for obtaining a resistance log as said drilling means bores into said formation.

10. Apparatus for exploration of the bottom of a body of water, comprising, a rotary, oscillating drill to be disposed in the water for boring into the bottom, said drill including an oscillating motor coupled to a bit and attached to an inertia barrel to produce stable movement of said drilling means into said water bottom, a power source mounted on and to be submerged with said drill and supplying all the energy to operate said motor, survey means on said drill to determine a characteristic of the formation being drilled, and a line attached to said drill to lower said drill and associated parts in water for drilling the bottom, control means to be disposed at the water surface for controlling the operation of said power source and said survey means.

11. Apparatus for exploration of the bottom of a body of water, comprising, a rotary, oscillating drill to be disposed in the water for boring into the bottom, said drill having a fluid operated oscillating motor, a bit driven by said motor for boring into the bottom to produce stable movement of said drill into said water bottom, an inertia barrel connected to said motor, pumping means on said drill for taking water from the body of water and driving said motor, means for energizing said pump, survey means mounted on said drill for determining a characteristic of the formation being drilled, means for lowering said drill in the water in a position to bore into the bottom.

12. Apparatus for exploration of the bottom of a body of water, comprising, a rotary, oscillating drill to be disposed in the water for boring into the bottom, said drill having a fluid operated oscillating motor, a bit driven by said fluid motor for boring into the bottom, an inertia barrel connected to said fluid motor, a fluid pump on said drill for taking water from the body of water and driving said fluid motor, a gas operated motor mounted on said drill and coupled to drive said fluid pump, a gas producing means for driving said gas operated motor, survey means mounted on said drill for determining a characteristic of the formation being drilled, control means to be disposed at the water surface for controlling the operation of said gas producing means and said survey means, a line attached to said drill to lower said drill and associated parts into water for drilling the bottom.

13. The invention, as described in claim 12, wherein said gas producing means comprises a vessel attached to said drill, a propellant in said vessel, an ignitor controlled by said control means for initiating burning of said propellant to generate a gas that is coupled to drive said gas motor.

14. Apparatus for sub-surface exploration, comprising a rotary, oscillating drill, means for energizing said drill to bore into a formation, means mounted on said drill to remove a sample from the borehole wall of the formation being drilled, said sampling means comprising a core barrel having a bit for cutting into the formation and arranged to remove a substantially vertical core, said core barrel being rotatably driven to remove the core as said drill bores into the formation.

15. The apparatus described in claim 14, wherein said sampling means is selectively operable from the surface to remove said core at different, spaced depths of said borehole.

16. The apparatus described in claim 14, wherein said core barrel is housed substantially within said drill, and said sampling means comprises means for selectively moving said core barrel into engagement with said borehole wall at different, spaced depths of said borehole.

17. The apparatus described in claim 14, wherein said core barrel is mounted outside said drill for rotary movement about an axis parallel to the length of said drill, said core barrel being driven for oscillating movement to remove said core as said drill bores into the formation.

18. Apparatus, as described in claim 14, wherein said sampling means includes means for storing said core, said storing means including a tube extending lengthwise of said borehole wall and stationarily mounted on said drilling means to receive said core from said core barrel.

19. Apparatus, as described in claim 14, wherein said sampling means includes means for storing said core, said storing means including a storage chamber extending lengthwise of said borehole wall along a substantial length of said drilling means for receiving a considerable length of core.

20. Apparatus, as described in claim 14, wherein said sampling means includes means for storing said core, said storing means including a storage chamber extending lengthwise of said borehole wall along the length of said drilling means and stationarily mounted on said drilling means, said core barrel being movable to engage said bit with said borehole wall, and said sampling means having means for coupling said core barrel to said chamber to provide for movement of said core from said core barrel to said stationary chamber as said core barrel is rotatably driven.

21. Apparatus, as defined in claim 20, wherein said coupling means is a flexible sleeve.

22. Apparatus for sub-surface exploration, comprising a rotary, oscillating drill, means for energizing said drill to bore into a formation, means mounted on said drill to remove a sample from the borehole wall of the formation being drilled, said sampling means comprising a core barrel having a bit for cutting into the formation, the length of said barrel being disposed substantially along the length of said drill to engage the borehole wall and remove a substantially vertical core, said barrel being rotatably driven as said drill bores into the formation.

23. The apparatus described in claim 22, wherein said core barrel is driven for oscillating movement to remove said core as said drill bores into the formation.

24. Apparatus for exploration of the bottom of a body of water, comprising, a rotary, oscillating drill to be disposed in the water for boring into the bottom, said drill comprising an oscillating motor coupled to a bit and attached to an inertia barrel, means for energizing said motor, a formation sampling means mounted on said drill, said sampling means comprising a core barrel rotatably attached to and extending lengthwise along a side of said drill, said barrel having a bit at the end adjacent said drill bit, means driven by said motor for rotatably driving said barrel to engage the formation and remove a sample, means for storing the sample within the core barrel.

25. The apparatus described in claim 24, wherein said core barrel is driven for oscillating movement to remove said core as said drill bores into the formation.

26. Apparatus for exploration of the bottom of a body of water, comprising, a rotary, oscillating drill to be disposed in the water for boring into the bottom, said drill comprising an oscillating motor coupled to a bit and attached to an inertia barrel, means for energizing said motor, a formation sampling means mounted on said drill, said sampling means comprising a carriage mounted lengthwise in a longitudinal recess of said inertia barrel, a core barrel extending lengthwise along the length of and rotatably attached to said carriage, means on said inertia barrel for pivoting the free end of said carriage from a first position within said inertia barrel to a second position outward from said inertia barrel, the free end of said core barrel having a bit for drilling into the borehole wall, means driven by said motor for rotatably driving said core barrel to cut into the formation and remove a sample that is stored in the core barrel, a line attached to said drill to lower said drill and associated parts into the water for drilling the bottom, means for actuating said pivot means at selected times from the surface.

27. The apparatus described in claim 26, wherein said core barrel is driven for oscillating movement to remove said core as said drill bores into the formation.

28. Apparatus for exploration of the bottom of a body of water, comprising, a rotary, oscillating drill to be disposed in the water for boring into the bottom, said drill comprising an oscillating motor coupled to a bit and attached to an inertia barrel, means for energizing said motor, a formation sampling means comprising a carriage mounted lengthwise in a longitudinal recess of said inertia barrel, said carriage being pivoted at the end opposite the drill bit to said inertia barrel, a core barrel extending lengthwise along the length of and rotatably attached to said carriage, a solenoid operated actuator arm on said inertia barrel for pivoting the free end of said carriage from a first position within said inertia barrel to a second position outward from said inertia barrel, the free end of said core barrel having a bit for drilling into the borehole wall in said second position, a first gear on said core barrel, a second gear rotatably mounted on said carriage and engaging said first gear, a flexible drive shaft coupled to said second gear and to said motor to drive said core barrel in rotary oscillations for cutting out the formation sample, a core tube on said inertia barrel communicating with said core barrel to receive the formation samples passing into and through said core barrel, a line attached to said drill to lower said drill and associated parts into water for drilling the bottom, said line having electric conductors connected to said solenoid, control means at the surface connected to said electrical conductors, to energize said solenoid at one or more selected depths of penetration of said drill in the formation to remove samples at these depths.

29. Apparatus for exploration of the bottom of a body of water, comprising a rotary, oscillating drill, said drill having an oscillating motor, a bit driven by said motor, an inertia barrel attached to said motor, said drill having an integral power source mounted thereon for energizing said motor, a line attached to said drill for lowering said drill into the water to a position for boring into the bottom, said drill having survey apparatus mounted thereon for determining a characteristic of a formation being drilled, and means to be disposed at the surface for operating said survey means.

30. Apparatus, as described in claim 29, wherein said survey means is a logging instrument in said drill for continuously determining a characteristic of the formation during boring, and said operation means at the surface indicates said formation characteristic.

31. Apparatus, as described in claim 29, wherein said survey means is a core sampling means arranged to continuously withdraw substantially vertical cores at selected depths in the formation.

32. Apparatus, as described in claim 31, wherein said sampling means is controlled by said operation means to take and store substantially vertical cores at selected depths in the formation.

33. Apparatus, as described in claim 29, wherein said oscillating motor is of the fluid type and said power source includes a fluid pump to be coupled to the body of water to pump water to actuate said fluid motor, a gas source coupled to drive said pump, thereby driving said oscillating motor and bit to bore into the formation.

34. A method of controlling the operation of a tool for exploration of the bottom of a body of water, wherein the tool comprises a motor driven drill for boring into the bottom and surveying means for determining a characteristic of the formation being drilled, said tool being lowered into the water and having a power source for energizing said motor to be turned on when the drill approaches the bottom, comprising the steps of lowering said tool with the power source turned off, measuring the water pressure adjacent said tool, turning said power source on when the water pressure reaches a predetermined amount corresponding to a predetermined depth.

35. Apparatus for sub-surface exploration, comprising rotary drilling means to be disposed at a depth beneath a surface, a power source on said drilling means to be disposed beneath said surface to supply all the energy for the drilling operation, said drilling means comprising a bit, a motor for rotatably driving said bit, a continuous gas producing means for driving said motor, said apparatus further comprising means to be disposed at the surface for controlling the operation of said gas producing means to start said motor.

36. Apparatus, as described in claim 35, wherein said gas producing means comprises a vessel attached to said drilling means, a cool burning propellant in said vessel, an ignitor controlled by said control means for initiating burning of said propellant to generate said gas.

37. Apparatus for exploration of the bottom of a body of water, comprising a rotary, oscillating drill, said drill having an oscillating motor, a bit driven by said motor, an inertia barrel attached to said motor, said drill having an integral power source mounted thereon for energizing said motor, a line attached to said drill for lowering said drill into the water to a position for boring into the bottom, said drill having survey apparatus mounted thereon for determining a characteristic of a formation being drilled.

References Cited
UNITED STATES PATENTS

| | | | |
|---|---|---|---|
| Re. 19,397 | 12/1934 | Bannister | 175—106 X |
| 478,791 | 7/1892 | Gardner | 175—93 X |
| 1,666,461 | 4/1928 | Lord | 175—50 X |
| 1,864,113 | 6/1932 | Anderson | 175—45 X |
| 2,673,069 | 3/1954 | Carpenter | 175—93 |
| 2,693,342 | 11/1954 | Lynes | 175—78 |
| 2,755,431 | 7/1956 | Scherbatskoy | 175—50 X |
| 2,906,502 | 9/1959 | Smith | 175—6 |
| 2,965,078 | 12/1960 | Chesnut et al. | 175—93 X |

OTHER REFERENCES

Underwater Drilling for any Depth. The Oil Weekly, Aug. 12, 1946, p. 60–62 inclusive, and 64–66 inclusive. Copy in Gr. 354.

ERNEST R. PURSER, *Primary Examiner.*